(12) United States Patent
Besling et al.

(10) Patent No.: US 9,016,133 B2
(45) Date of Patent: Apr. 28, 2015

(54) PRESSURE SENSOR WITH PRESSURE-ACTUATED SWITCH

(75) Inventors: William Frederick Adrianus Besling, Eindhoven (NL); Peter Gerard Steeneken, Valkenswaard (NL); Olaf Wunnicke, Eindhoven (NL)

(73) Assignee: NXP, B.V., Eindhoven (NL)

( * ) Notice: Subject to any disclaimer, the term of this patent is extended or adjusted under 35 U.S.C. 154(b) by 689 days.

(21) Appl. No.: 12/985,052

(22) Filed: Jan. 5, 2011

(65) Prior Publication Data
US 2012/0167659 A1  Jul. 5, 2012

(51) Int. Cl.
| H01H 35/34 | (2006.01) |
| G01L 19/12 | (2006.01) |
| G01L 7/08 | (2006.01) |
| G01L 9/00 | (2006.01) |

(52) U.S. Cl.
CPC ............ G01L 9/0047 (2013.01); H01H 35/346 (2013.01); G01L 9/0072 (2013.01)

(58) Field of Classification Search
CPC ..... G01L 9/0041; G01L 13/025; G01L 15/00; G01L 19/0092; G01L 19/14
USPC ....... 73/700, 715–728; 200/81 R, 83 R, 83 A, 200/83 B, 83 N
See application file for complete search history.

(56) References Cited

U.S. PATENT DOCUMENTS

| 2,381,582 | A | * | 8/1945 | Erickson | 200/83 B |
| 2,697,766 | A | * | 12/1954 | Goldmuntz | 337/117 |
| 2,721,913 | A | * | 10/1955 | Kent, Jr. | 200/83 N |
| 2,919,320 | A | * | 12/1959 | Edwards, Jr. et al. | 200/83 B |
| 3,233,059 | A | * | 2/1966 | Pridham, Jr. et al. | 200/83 N |
| 3,638,497 | A | * | 2/1972 | Frenkel | 73/728 |
| 3,717,861 | A | * | 2/1973 | Wright, Jr. | 340/601 |
| 3,723,684 | A | * | 3/1973 | Greenwood | 200/83 R |
| 3,743,801 | A | * | 7/1973 | Brobeck et al. | 200/61.25 |
| 3,760,350 | A | * | 9/1973 | Johnson | 340/442 |
| 3,803,374 | A | * | 4/1974 | Delgendre et al. | 200/61.08 |
| 3,993,939 | A | * | 11/1976 | Slavin et al. | 361/283.4 |
| 4,064,550 | A | * | 12/1977 | Dias et al. | 361/283.4 |

(Continued)

FOREIGN PATENT DOCUMENTS

| EP | 2 317 532 A1 | 5/2011 |
| EP | 2 402 284 A1 | 1/2012 |

(Continued)

OTHER PUBLICATIONS unpublished U.S. Appl. No. 12/942,051, filed Dec. 9, 2010.

*Primary Examiner* — David A Rogers

(57) ABSTRACT

Various embodiments relate to a pressure sensor and related methods of manufacturing and use. A pressure sensor may include an electrical contact included in a flexible membrane that deflects in response to a measured ambient pressure. The electrical contact may be separated from a signal path through a cavity formed using a sacrificial layer and PVD plugs. At one or more defined touch-point pressure thresholds, the membrane of the pressure sensor may deflect so that the state of contact between an electrical contact and one or more sections of a signal path may change. In some embodiments, the change of state may cause the pressure sensor to trigger an alarm in the electrical circuit. Various embodiments also enable the operation of the electrical circuit for testing and calibration through the use of one or more actuation electrode layers.

19 Claims, 14 Drawing Sheets

(56) References Cited

U.S. PATENT DOCUMENTS

| | | | |
|---|---|---|---|
| 4,084,438 A * | 4/1978 | Lee et al. | 73/706 |
| 4,160,139 A * | 7/1979 | Johnston | 200/83 N |
| 4,342,230 A * | 8/1982 | Okamura et al. | 73/702 |
| 4,422,335 A * | 12/1983 | Ohnesorge et al. | 73/724 |
| 4,730,496 A * | 3/1988 | Knecht et al. | 73/724 |
| 4,737,660 A * | 4/1988 | Allen et al. | 307/112 |
| 4,823,230 A * | 4/1989 | Tiemann | 361/283.1 |
| 4,965,415 A * | 10/1990 | Young et al. | 200/83 N |
| 5,101,549 A * | 4/1992 | Sogge et al. | 29/622 |
| 5,150,275 A * | 9/1992 | Lee et al. | 361/283.4 |
| 5,155,653 A * | 10/1992 | Kremidas | 361/283.4 |
| 5,177,579 A * | 1/1993 | Jerman | 73/724 |
| 5,186,054 A * | 2/1993 | Sekimura | 73/724 |
| 5,225,643 A * | 7/1993 | Marchant | 200/83 Y |
| 5,331,126 A * | 7/1994 | Dwyer et al. | 200/83 P |
| 5,378,864 A * | 1/1995 | Olivier et al. | 200/61.08 |
| 5,479,042 A * | 12/1995 | James et al. | 257/415 |
| 5,824,910 A * | 10/1998 | Last et al. | 73/715 |
| 6,040,536 A * | 3/2000 | Miller et al. | 200/83 N |
| 6,175,301 B1 * | 1/2001 | Piesinger | 340/442 |
| 6,194,678 B1 * | 2/2001 | Yoshikawa et al. | 200/512 |
| 6,318,497 B1 * | 11/2001 | De Groot et al. | 181/110 |
| 6,370,960 B1 * | 4/2002 | Igel et al. | 73/724 |
| 6,439,056 B1 * | 8/2002 | Jonsson | 73/708 |
| 6,470,754 B1 * | 10/2002 | Gianchandani | 73/718 |
| 6,596,951 B1 * | 7/2003 | Cusack | 200/83 P |
| 6,670,750 B2 * | 12/2003 | Hanahara et al. | 313/511 |
| 6,698,294 B2 * | 3/2004 | Jacob et al. | 73/708 |
| 6,716,619 B1 | 4/2004 | Muraca | |
| 7,047,810 B2 * | 5/2006 | Kogan et al. | 73/702 |
| 7,102,472 B1 * | 9/2006 | Nathanson et al. | 335/78 |
| 7,360,429 B1 | 4/2008 | Filippelli | |
| 7,377,175 B2 * | 5/2008 | Matsubara | 73/715 |
| 7,389,697 B2 * | 6/2008 | Jonsson | 73/724 |
| 7,570,543 B2 * | 8/2009 | Ferguson | 367/172 |
| 7,624,643 B2 * | 12/2009 | Grudzien | 73/718 |
| 8,456,260 B2 | 6/2013 | Steeneken et al. | |
| 2001/0025779 A1 * | 10/2001 | Yeh | 200/515 |
| 2003/0000821 A1 * | 1/2003 | Takahashi et al. | 200/512 |
| 2007/0141808 A1 * | 6/2007 | Fortin et al. | 438/459 |
| 2008/0210012 A1 * | 9/2008 | Silverbrook et al. | 73/708 |
| 2011/0038093 A1 | 2/2011 | Furukawa et al. | |
| 2011/0051312 A1 | 3/2011 | Steeneken et al. | |
| 2011/0203347 A1 * | 8/2011 | Hower et al. | 73/12.01 |

FOREIGN PATENT DOCUMENTS

| | | |
|---|---|---|
| WO | 2009/147600 A1 | 12/2009 |
| WO | 2010/010505 A1 | 1/2010 |
| WO | 2010/106484 A1 | 9/2010 |
| WO | 2010/128482 A1 | 11/2010 |

* cited by examiner

PRESSURE SENSOR WITH PRESSURE-ACTUATED SWITCH

TECHNICAL FIELD

Various exemplary embodiments disclosed herein relate generally to pressure sensors and pressure-sensitive electrical switches and circuits.

BACKGROUND

Various engineered systems use pressure sensors with linear outputs to track changes in operation before such operational conditions become critical. These pressure sensors may also include pressure switches that trigger quick reaction in response to a measured critical condition. Silicon-based pressure sensors and/or switches, such as sensors using microelectromechanical system (MEMS) technology, have recently been used for detection of pressure, especially in systems that also include electrical circuits. Such MEMS pressure sensors usually include piezo-resistive or capacitive components to measure ambient pressure in non-critical conditions.

MEMS switches include components like deflecting beams or cantilevers that make galvanic contact with each other. Similarly, some MEMS switches include beam-suspended, perforated plates that change an attached electrical circuit's impedance capacitatively. However, both types of these existing MEMS switches require perfect sealing from the environment to avoid degradation, such as contact degradation. Such requirements impose severe restraints on the packaging of such switches.

In addition, certain applications require immediate action when a critical pressure threshold is reached. However, many mechanical safety measures (e.g., mechanical vanes, etc.) used to respond to such measured pressures may not allow electrical or electronic control. Similarly, electronic sensors may require constant power to operate correctly and may still exhibit a more delayed response when compared to like mechanical sensors.

SUMMARY

Provided are embodiments that enable a pressure sensor and a pressure-actuated switch that may measure linear pressure changes and is responsive to critical pressure levels. In particular, various embodiments enable a pressure sensor that may control a current flow in an electronic circuit, enabling alarms and other responses to pressure measurements.

A brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in the later sections.

Various embodiments may relate to a pressure sensor comprising a substrate including a first metallic contact, a membrane attached to the substrate that includes a second metallic contact and responds to pressure by deflection, and a cavity wherein the first and second metallic contacts are located. The pressure sensor may also comprise a contact area between the first and second metallic contacts that enables contact between the first and second contacts when the membrane deflects at a defined pressure and a signal path that allows a current flow when the first metallic contact makes contact with the second metallic contact. Some embodiments of the pressure sensor may also comprise a first actuation electrode layer on the substrate and a second actuation electrode layer on the membrane.

Various embodiments may also relate to a method comprising providing, by a substrate, a first metallic contact, and measuring, by a pressure sensor having a membrane including a second metallic contact, a defined pressure. The method may also comprise deflecting, by the membrane in response to the defined pressure, through a height of a cavity to the substrate, making, by the second metallic contact, contact with the first metallic contact when the membrane deflects at the defined pressure; and conducting, by a signal path, a current flow when the first metallic contact makes contact with the second contact.

Various embodiments may also relate to a method of producing a pressure sensor comprising depositing and patterning a first metallic layer on a substrate, depositing and patterning a sacrificial layer upon the first metallic layer and substrate, and depositing and patterning a second metallic layer on the sacrificial layer. The method may also comprise etching a hole to the sacrificial layer, removing the sacrificial layer, and plugging the etched hole with a plug.

It should be apparent that, in this manner, various exemplary embodiments enable a pressure sensor and pressure-actuated switch. Particularly, by providing a pressure sensor and a pressure-actuated switch, a pressure sensor that may measure ambient pressures may also be responsive to critical pressures.

BRIEF DESCRIPTION OF THE DRAWINGS

In order to better understand various exemplary embodiments, reference is made to the accompanying drawings wherein.

DETAILED DESCRIPTION

Figure 1A:
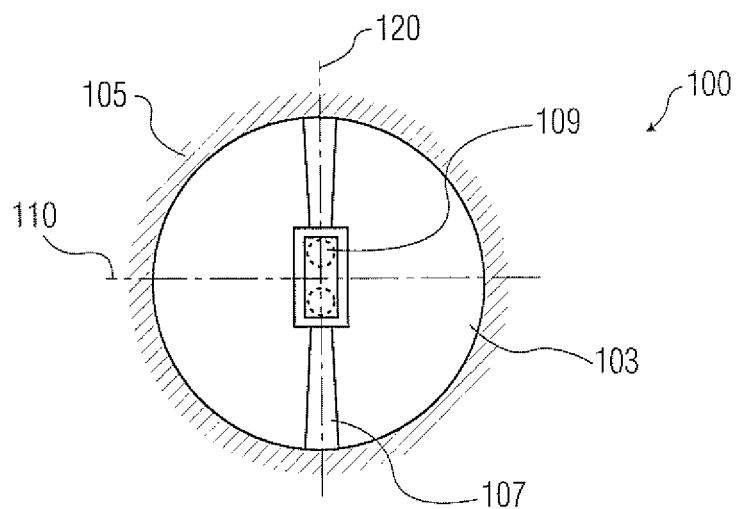
FIGS. 1A-1C illustrate an exemplary pressure sensor and various cross-sections of the exemplary pressure sensor.

Referring now to the drawings, in which like numerals refer to like components or steps, there are disclosed broad aspects of various exemplary embodiments.

Figure 1B:
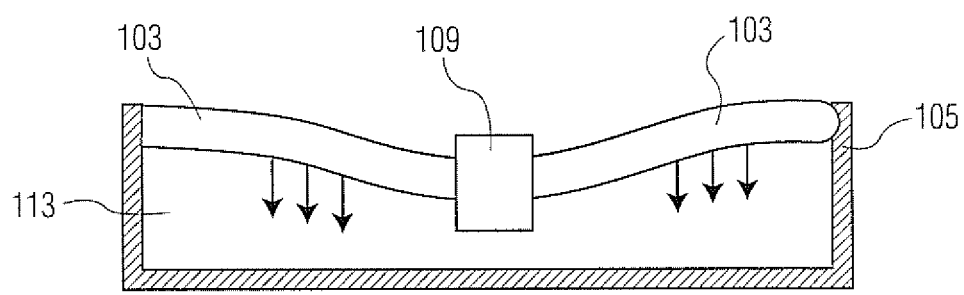
Figure 1C:
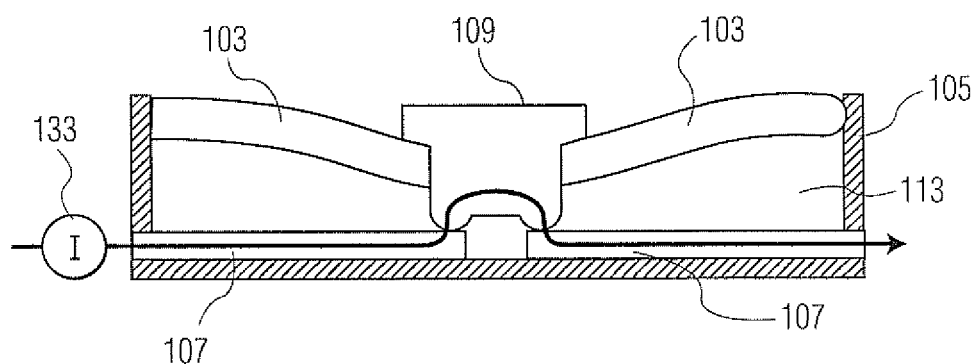

FIGS. 1A-1C illustrate an exemplary pressure and various cross-sections of the exemplary pressure sensor. FIG. 1A illustrates a top view of the pressure sensor 100, while FIG. 1B illustrates the pressure sensor 100 along the 110 cross-section, and FIG. 1C illustrates the pressure sensor 100 along the 120 cross-section. Pressure sensor 100 may comprise a membrane 103, a substrate 105, a signal path 107, and an electrical contact 109. As shown in FIGS. 1B-1C, the pressure sensor 100 may include a cavity 113 between the membrane 103 and the substrate 105. In some embodiments, the pressure sensor 100 may include a signal path 107, and one or more electrical contacts 109 that may be connected with each other in certain pressure ranges; in such instances a signal or current flow may traverse through the signal path 107 and the electrical contact 109. In some embodiments, the contact between the signal path 107 and the electrical contact 109 may trigger an alarm or a similar response in an electrical circuit that responds to the signal or current flow.

Substrate 105 may comprise a physical vapor deposition (PVD) material that may enable contact with other components, such as electrical connections to an external electrical circuit. As will be discussed in further detail in relation to FIGS. 6A-6L, the outer layer 105 may have a composition of a PVD material. In some embodiments, the substrate 105 may have a standard CMOS substrate composition, with a finite number of metal layers deposited as a back-end-of-line (BEOL) interconnect material. Membrane 103 may be attached at the sides to the sides of the substrate 105. In such instances, the sides of the membrane 103 may remain relatively fixed, while portions farther away from the substrate may move parallel to the sides, deflecting through the height of the cavity 113.

Signal path 107 may include one or more pieces of conductive material that may be used to form an electrical circuit. In some embodiments, the composition of the signal path 107 may include a non-corrosive, non-oxidative material, such as gold, platinum, or similar noble materials. In some embodiments, the composition of the signal path 107 may include refractory materials that may be chosen based on availability during manufacture. As illustrated in FIG. 1C, when the electrical contact 109 makes galvanic contact with portions of the signal path 107, an electrical signal in the electrical circuit may be allowed to flow through both the electrical contact 109 and the signal path 107.

Electrical contact 109 may be one or more contacts positioned within the membrane 103 or the substrate 109 that may make contact with one or more portions of the signal path 107 at a defined pressure or within a defined pressure range. Electrical contact 109 may be made of the same conductive material as the signal path and may include one or more interconnect dimples that may enable contact with one or more portions of a signal path 107 when the membrane 103 experiences a deflection equal to the height of the cavity 113. FIG. 1C illustrates an exemplary electrical contact 109 included in the membrane 103 that comprises two interconnect dimples that enable contact with separate sections of the signal path 107 when the membrane deflects through the height of the cavity 113. In the illustrative embodiment, the two dimples in the electrical contact 109 form a bridge with the portions of the signal path by making contact, such as galvanic contact, to close the electrical circuit. This may occur when the membrane deflects at a touch-point pressure. When the measured ambient pressure is equal to or above the touch-point pressure, the electrical contact 109 may maintain such galvanic contact with the signal path 107. In this embodiment, the contact may be direct, coupled, or galvanic such that direct current may flow through the signal path 107.

Membrane 103 may be a flexible membrane that may deflect a specified deflection distance in response to a measured pressure. In some embodiments, the membrane 103 may also be made of stiff ceramic composition (i.e., $Si_3N_4$) having a high Young's modulus; in such instances, the membrane 103 determines its deflection profile as a function of ambient pressure. As illustrated in FIG. 1A, in some embodiments, the membrane 103 may comprise a circular diaphragm of a defined diameter with one or more electrical contacts 107 included in the diaphragm. Membrane 103 may formed as a circular diaphragm, as the circular diaphragm is a robust shape against a large stress gradient; however, other shapes for the diaphragm comprising the membrane 103, such as a hexagonal, square, or rectangular shape, may be used when creating the membrane 103. Both the membrane 103 and the location of the one or more electrical contacts 109 within the membrane 103 may be designed to operate within a defined pressure range and designed to respond to one or more pressure thresholds.

For example, when the membrane 103 comprises a circular diaphragm, the perpendicular deflection (w) of the circular membrane 103 within the cavity 113 may be directly related to a measured ambient pressure (P):

$$w(P) \propto kP$$

Where k is a defined constant at the time of manufacture. For a given radius (R) of the membrane 103, the expected deflection ($w_D$) may be calculated according to the equation:

$$w_D(r, P) = \frac{3\pi PR^4(1-v^2)}{16\pi Eh^3}\left[1 - \left(\frac{r}{R}\right)^2\right]^2$$

Where r is the distance from the edge of the membrane 103 to the deflection point (e.g., position of the electrical contact 107), v is the Poisson ratio, E is the Young's modulus, and h is the thickness of the membrane 103. This formula may be used, for example, to determine the expected deflection of the membrane 103 in response to a measured ambient pressure when there is no internal stress present within the pressure sensor 100. As both the Poisson ratio and the Young's modulus are based on the properties of the material of the membrane 103 and on the method of creating the membrane 103, the membrane 103 may be designed to operate to react for a defined pressure range through choice of materials and choice of manufacturing methods. Using this calculation, the electrical contact 109 may be positioned (i.e., solving for r) so that the expected deflection $w_D$ is equal to the height of the cavity 113 at defined pressure P. When the expected deflection is equal to the height of the cavity 113, the electrical contact 109 may make galvanic contact with the actuation signal path 107 on the opposite side of the cavity and current may flow.

In some embodiments, there may be a significant amount of internal stress within the pressure sensor 100. In such instances, the membrane 103 may become stiffer due to internal tension and, as a result, higher pressures may be necessary to deflect the membrane 103 the same distance within the cavity 113. The extra pressure required to exert on the membrane 103 may be equal to the internal tension of the membrane. This internal tension ($\sigma$) may be defined as:

$$\sigma \approx \frac{4Eh^2}{3R^2(1-v^2)}$$

In some embodiments, the Timoshenko load-deflection model (based on Timoshenko beam theory) may be used to determine the transition point where the membrane 103 will deflect in response to a measured ambient pressure. For example, when the membrane 103 is circular diaphragm and subject to large deflections as a result of an applied, uniform external pressure, the pressure sensor 100 may include a touch-point pressure ($P_t$), which may be defined as the pressure at which the deflection zoo is equal to the height of the cavity 113. When accounting for stiffness in the membrane 103 due to bending and residual stress, while also accounting for stiffness in the membrane 103 due to non-linear stretching (e.g., a result of large deflections), the pressure may directly affect the touch-point deflection ($w_0$) of the membrane 103:

$$P_t = \left[\frac{4\sigma_0 h}{a^2} + \frac{64D}{a^4}\right]w_0 + \left[\frac{128\alpha D}{h^2 a^4}\right]w_0^3$$

Where h is the thickness of the membrane 103, $\alpha$ is the radius of the membrane 103, $\sigma_0$ is the residual stress, D is the flexural rigidity, and $\alpha$ is the Poisson ratio-dependent empirical parameter. In some embodiments, the above equation may be used to determine the touch-point pressure for the center of the membrane 103 when the membrane 103 comprises a circular diaphragm. In such instances, the pressure sensor may be designed such that the electrical contact 109 may is positioned in the center of the membrane, at least one portion of the signal path is positioned to make contact with the electrical contact 109 when the membrane 103 deflects, and the radius of the membrane 103 may set so that the pressure sensor 101 operates for a designated touch-point pressure. In alternative embodiments, the applicable pressure range may also be adjusted by modifying the thickness of the membrane 102, the height of the cavity 113, and the internal stress of the membrane 103.

Cavity 113 between the membrane 103 and the substrate 105 may be created through a deposit and removal of a sacrificial layer during manufacture, with one or more physical vapor deposition (PVD) metallic plugs hermetically sealing the cavity 113 from the outside environment. In some embodiments, the cavity 113 may comprise a sealed vacuum. Cavity 113 may be designed to have a defined gap height between the one or more electrical contacts 109 in the membrane 103 and a portion of the signal path 107 on the substrate 105. In such instances, the gap height of the cavity 113 may be chosen so that at a touch-point pressure, the electrical contact 109 makes contact with a portion of the signal path 107 due to a deflection of the membrane 103 that is equal to that of the gap height of the cavity 113.

Figure 1D:
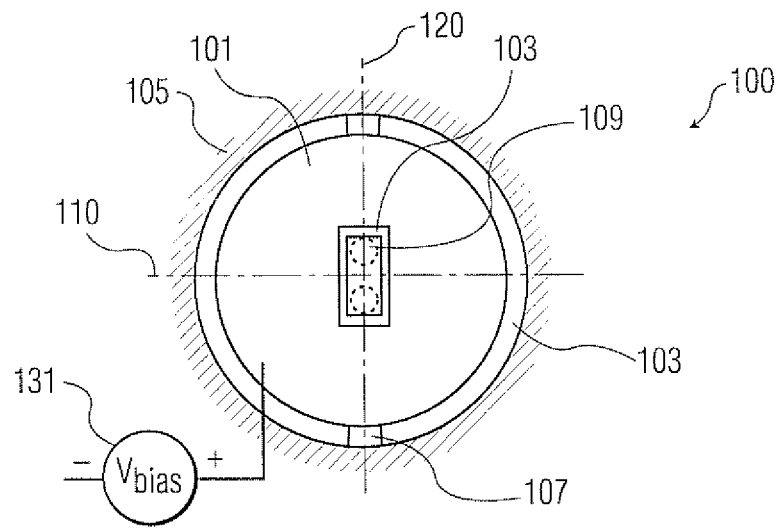
FIGS. 1D-1F illustrate another exemplary pressure sensor and pressure-actuated switch using an actuation electrode layer, with cross-sections of the exemplary pressure sensor and switch.
Figure 1E:
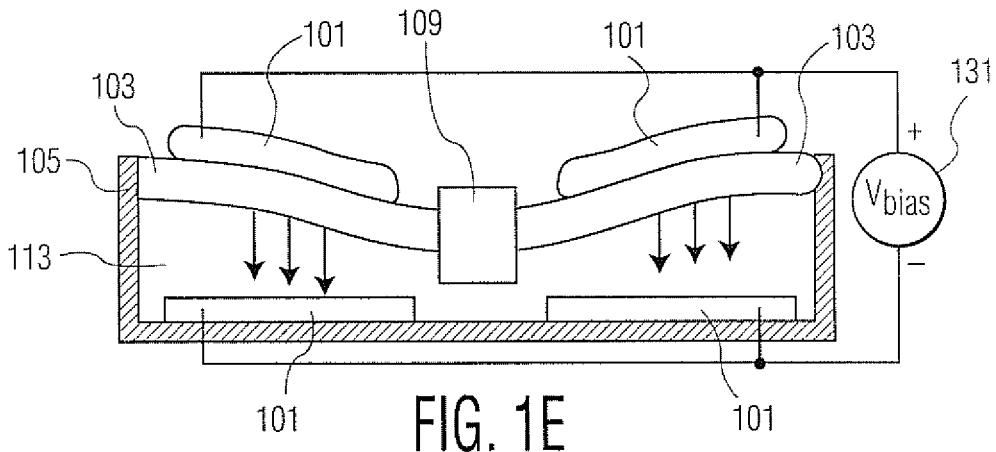
Figure 1F:
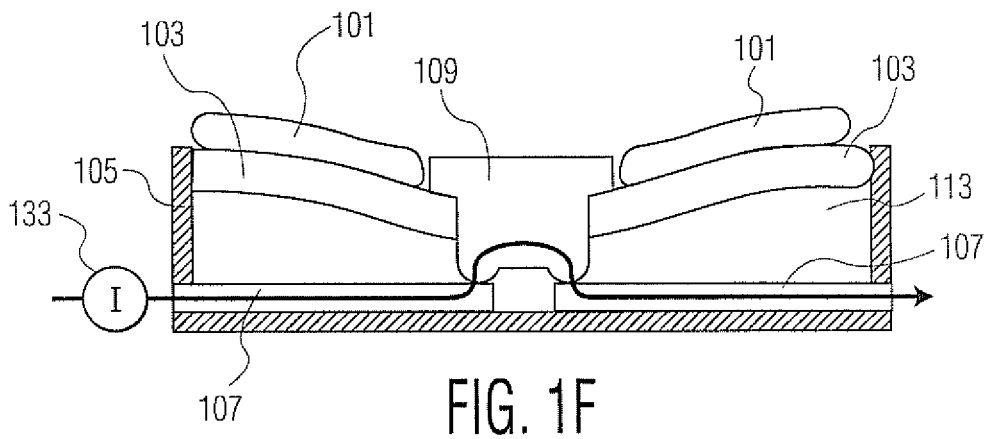

FIGS. 1D-1F illustrate another exemplary pressure sensor 100. In addition to the components 103-120 shown in FIGS. 1A-1C, the pressure sensor in FIGS. 1D-1F also include an actuation electrode layer 101. Pressure sensor may use the at least one actuation electrode layer 101 to form a pressure-actuated switch. In such embodiments, the pressure-actuated switch may be an electrostatic, microelectromechanical systems (MEMS) switch that may be manufactured using MEMS techniques, which are well known to one skilled in the art. Actuation electrode layer 101 may comprise one or more electrical conductors that may respond to an electrical current by applying pressure on the membrane 103. In some embodiments, the actuation electrode layer 101 may be made from conductive materials, such as metals, metal alloys, and metal compounds, such as metal nitrides, metal carbides, and metal silicides. In some embodiments, the actuation electrodes 101 may be deposited with the electrical contact 109 and/or signal path 107 and may therefore make galvanic contact with one or more of these components.

In some embodiments, a second actuation electrode layer 101 may also be included on the substrate 105. As illustrated in FIGS. 1E-1F, the actuation electrode layer 101 on the substrate may be deposited on the same layer as that of the signal path 107. In some embodiments, the actuation electrodes 101 may create an electrical field within the cavity 113. This may be done, for example, through the use of a bias voltage, illustrated in FIG. 1E as a bias voltage source, that is connected to both actuation electrode layers 101. In such instances, the actuation electrode layers 101 may act as a capacitor with an electrical field through the gap comprising the cavity 113. The electrical field may then exert a pressure similar to the ambient pressure measured by the pressure sensor 100. In such instances, the first and second actuation electrodes 101 may then cause the membrane 103 to deflect through the cavity 113.

When the actuation electrode layers 101 cause the electrical contact 109 to make galvanic contact with at least a portion of the signal path 107, the current flow through the signal path may be a different electrical circuit than the circuit formed by the bias voltage 131 and the actuation electrode layers 101. The actuation electrode circuit may therefore trigger the electrical circuit that includes the signal path 107. This may be done, for example, to calibrate and test the pressure switch, as well as to adjust for any drift in the signal. For example, in FIG. 1C, galvanic contact between the electrical contact 109 and the signal path 107 may allow a non-zero current flow. The current flow may trigger an alarm. A user may activate the bias voltage in order to determine whether the alarm is functioning correctly.

In other embodiments, the actuation electrode circuit may be measured to, for example, determine the ambient pressure measured by the membrane 103. This may be done, for example, by measuring the capacitance between the two actuation electrode layers 101. As the size of the actuation electrode layers 101 is known, the capacitance may be directly proportional to the current gap height of the cavity, which has an inverse relationship with the ambient pressure. From this measured value, the ambient pressure may be calculated. In some embodiments, the measured pressure may be saved in a memory or read-out on a connected display.

In some embodiments, pressure may rise within the cavity 113 after the initial manufacture. This may occur, for example, when the pressure sensor 100 is exposed to harsh environments, which may, for example, result in hydrogen diffusion into the cavity from the outside environment do to $H^+$ generation and recombination with electrons at the opposite actuation electrode 101. Similarly, the pressure of within the cavity 113 may rise due to hydrogen effusion from the silicon nitride-capping membrane. In response, a high-density, nitrogen-rich silicon nitride film may be used when manufacturing the pressure sensor 100 to alleviate such occurrences from arising.

In addition, potential drifts in pressure may be mitigated through an internal calibration of the pressure sensor 100, which may determine whether the pressure sensor 100 needs to be adjusted or replaced. When the ambient pressure is known, the capacitance may be measured between the actuation electrode layers 101. From this measurement, the actual deflection profile of the pressure sensor 100 may be compared to the theoretical deflection profile of the pressure sensor 100. In some embodiments, this may come in the form of calibration data that may be saved in a memory component. Similarly, at a defined bias voltage on the actuation electrodes 101, the membrane 103 may be pulled into collapse (such a point may be accurately determined using the electrical contacts 109). The theoretical bias voltage may then be calculated for the expected collapse of the membrane 103. These theoretical values may be compared to the actual voltage of the collapse and may be used to calculate the offset of the switch 100.

For both manual calibration and for switch adjustment, the pressure sensor 100 may have the actuation electrode circuit deflect the membrane 103 using an applied electrical field. The bias voltage used to deflect the membrane 103 may increase until the membrane 103 experiences a touch-point pressure and the electrical contact 109 connects with the signal path 107. The measured touch-point pressure may then be compared with the initial touch-point pressure or theoretical touch point pressure, which may be saved in a memory component. In some embodiments, a specific bias voltage may be applied to set the deflection of the membrane 103 to account for any differences between the actual and theoretical deflection points in the membrane 103.

In some embodiments, a second sensor comprising a second membrane (not shown) may be used in addition to the first membrane 103 to, for example, mitigate adverse effects of temperature on the calculated touch-point pressure. In such instances, the second membrane may not have any actuation electrodes 101 attached to it, but the second membrane may include a contact dimple. Though the second membrane will not be actuated, the second membrane may have a smaller temperature dependence than the first membrane 103 attached to the actuation electrodes 101; this may be due to a lower thermal expansion coefficient. The two switches 100 may be placed in series so that current would only flow if both switches 100 were open or, alternatively, if both switches were closed. In alternative embodiments, when a switch 100 is closed due to thermal expansion but before the touch-point pressure threshold, the second sensor may be activated to validate the pressure reading.

Figure 1G:
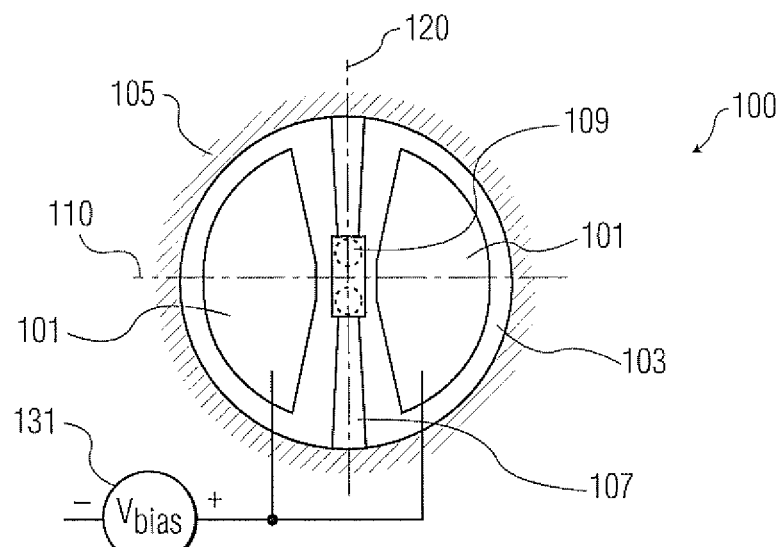
FIGS. 1G-1I illustrate another exemplary pressure sensor and pressure-actuated switch using an actuation electrode layer, with cross-sections of the exemplary pressure sensor and switch.
Figure 1H:
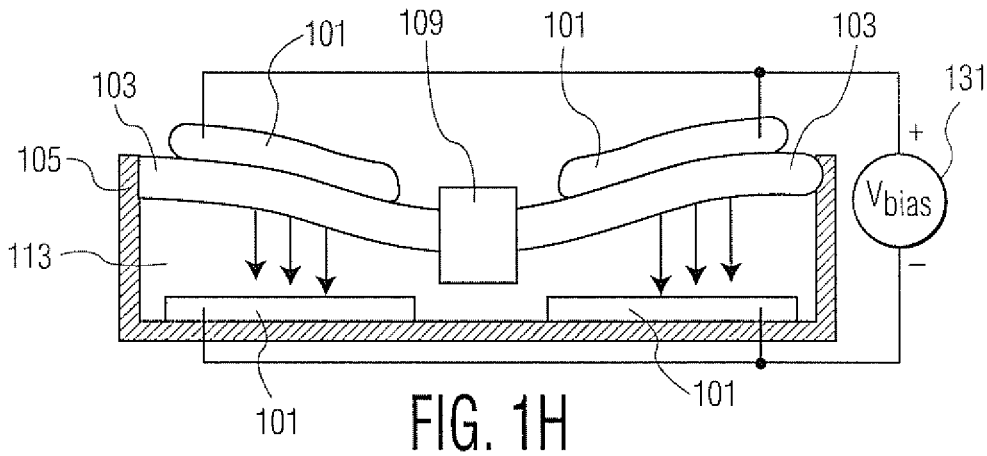
Figure 1I:
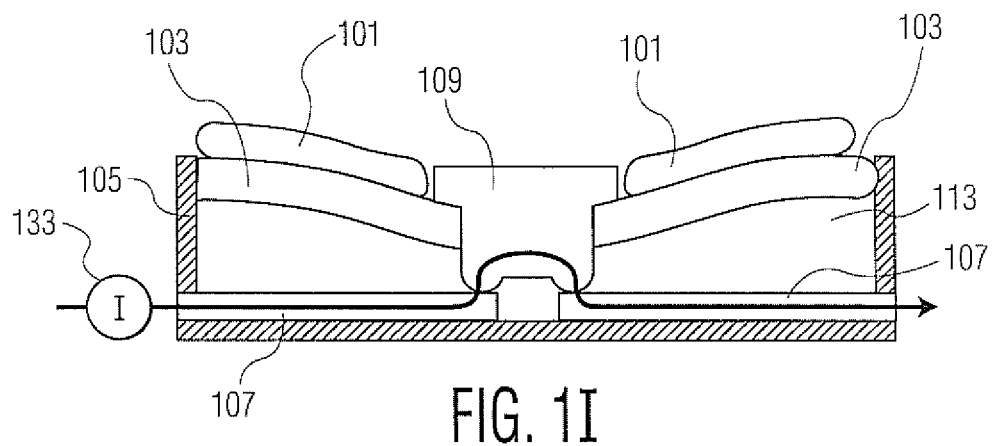

FIGS. 1G-1I illustrate another exemplary pressure sensor using an exemplary electrode layer. Similar to the pressure sensor 100 of FIGS. 1D-1F, the top electrode layer 101 in FIGS. 1G-1I comprise two separate portions. As illustrated in FIG. 1H, the actuation electrode portions may not be physically connected, but the portions may be electrically connected through the actuation electrode circuit to the bias voltage 131.

Figure 2A:
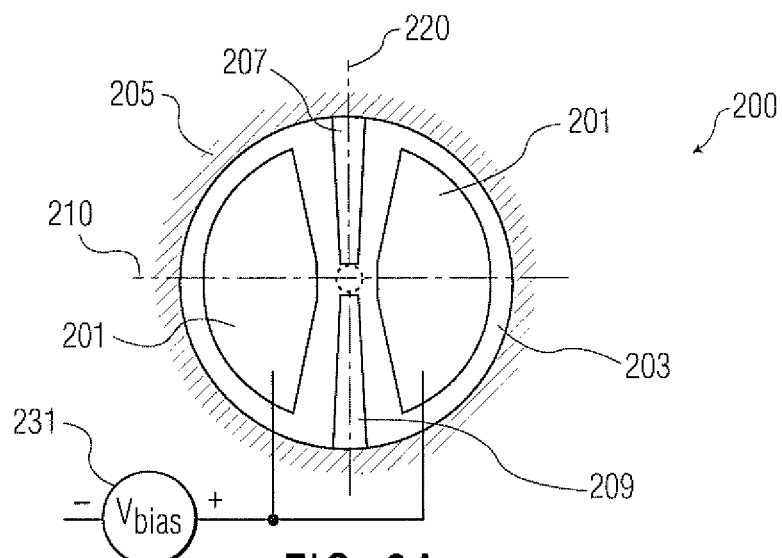
FIGS. 2A-2C illustrate another exemplary pressure sensor and pressure-actuated switch using a signal path through the membrane, with cross-sections of the exemplary pressure sensor and switch.
Figure 2B:
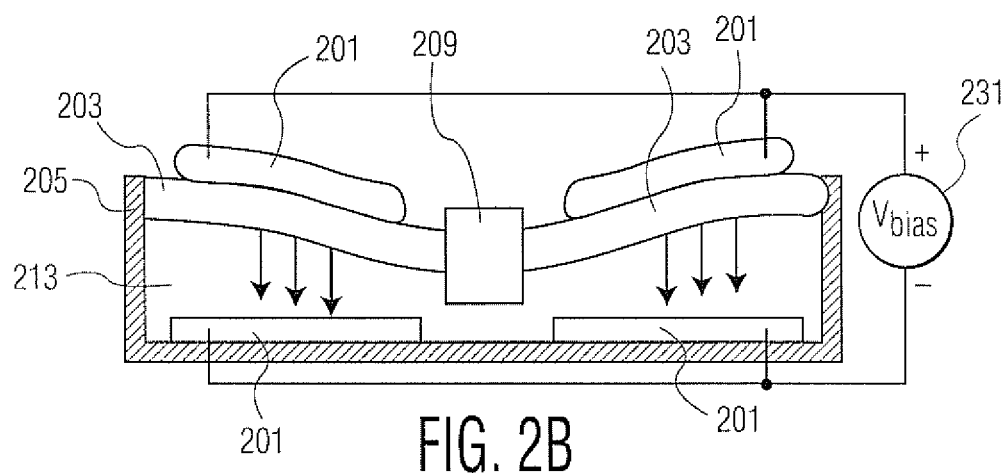
Figure 2C:
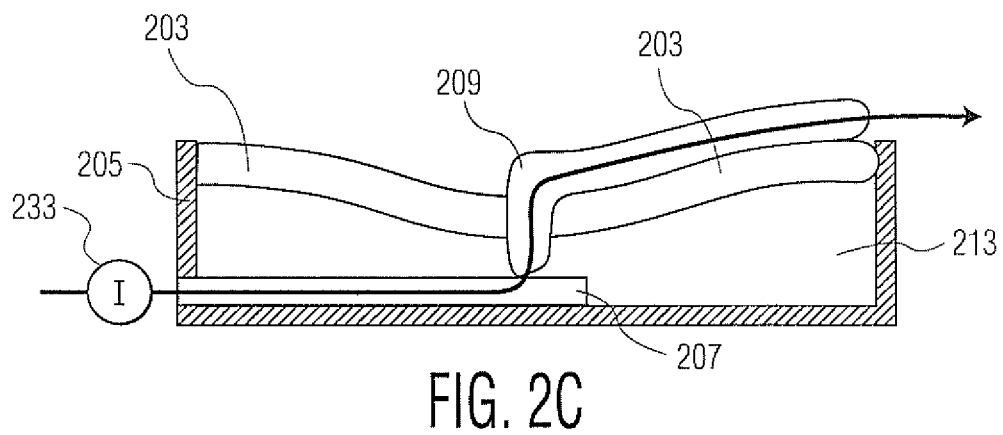

FIGS. 2A-2C illustrate another exemplary pressure sensor that includes a signal path through the membrane. Pressure sensor 200 similar to the pressure sensor 100 of FIGS. 1A-1I and includes similar components 201-233. However, the signal path 207 and the electrical contacts 209 may be configured in a different manner than in the pressure sensor 100. For example, as shown in FIGS. 2A-2C, the electrical contact 209 may also include a portion of the signal path. In the illustrative embodiment, for example, the electrical contact 209 includes an interconnect that comprises only of one dimple. The interconnect may only require one dimple in this instance, as the electrical contact includes a portion of the signal path traversing on the membrane 203. As a result, when the electrical contact 209 makes contact with the portion of the signal path on the substrate 205, the current flows through the bottom portion of the signal path and continues through the electrical contact 209, traversing by the membrane 203. While the illustrative embodiment shows the signal path 207 traverse above the membrane 203, various other embodiments may have the signal path 207 connected to the membrane within the cavity 213.

Figure 2D:
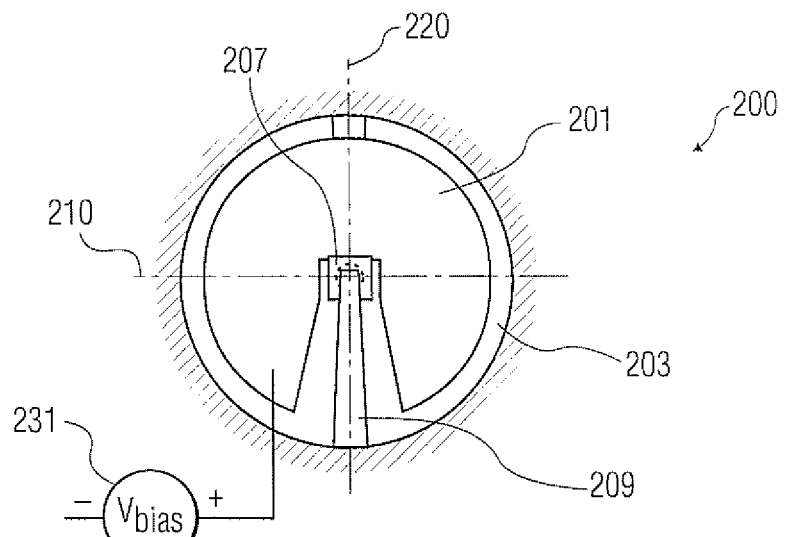
FIGS. 2D-2F illustrate another exemplary pressure sensor and pressure-actuated switch using a dimple on the bottom signal path, with cross-sections of the exemplary pressure sensor and switch.
Figure 2E:
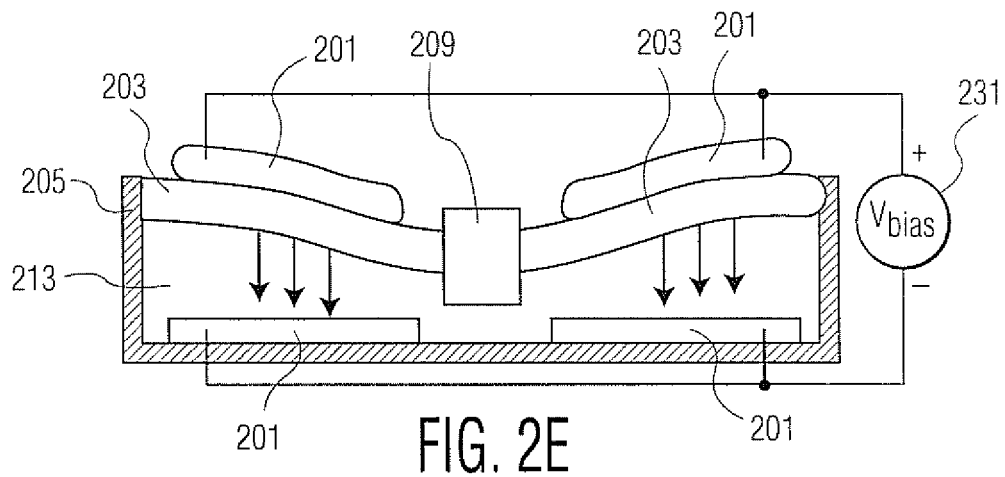
Figure 2F:
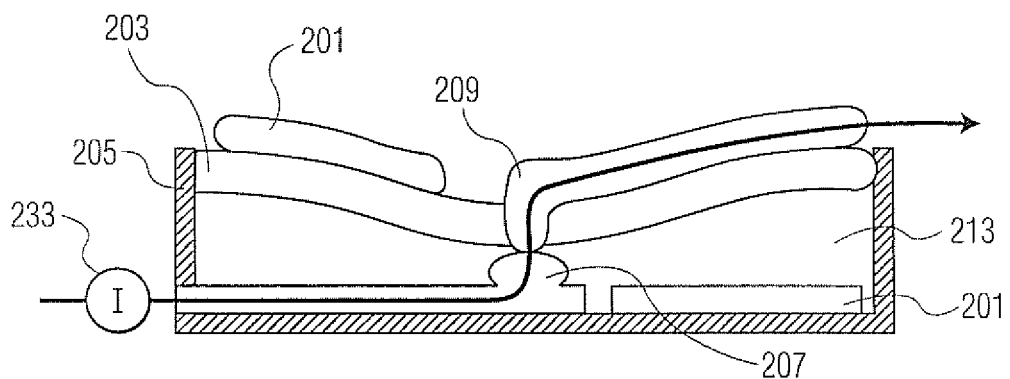

FIGS. 2D-2F illustrate another exemplary pressure sensor that includes a signal path through the membrane. Similar to the pressure sensor 200 in FIGS. 2A-2C, the pressure sensor 200 of FIGS. 2D-2F includes an electrical contact 209 with a signal path 207 connected to the membrane 203. FIGS. 2F illustrates, however, that the signal path 207 connected to the substrate includes the interconnect with at least one dimple. The interconnect in the bottom portion of the signal path 207 may act in a similar manner as the interconnect that may be included in the electrical contact 209.

Figure 2G:
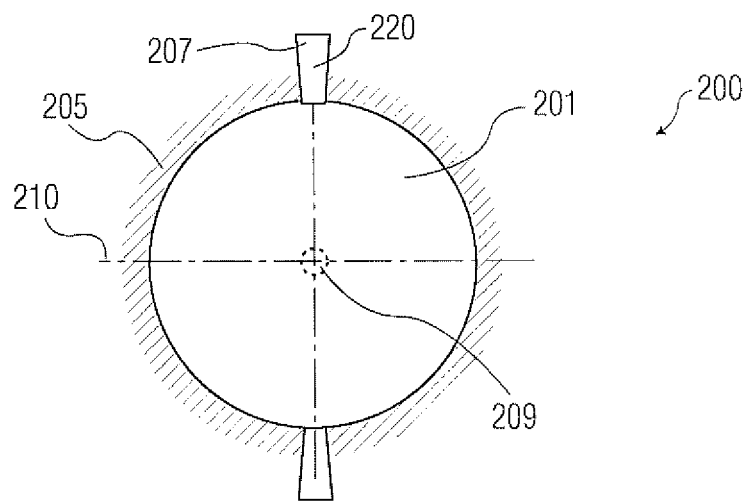
FIGS. 2G-2I illustrate another exemplary pressure sensor and pressure-actuated switch using an actuation electrode layer with an electrical contact, with cross-sections of the exemplary pressure sensor and switch.
Figure 2H:
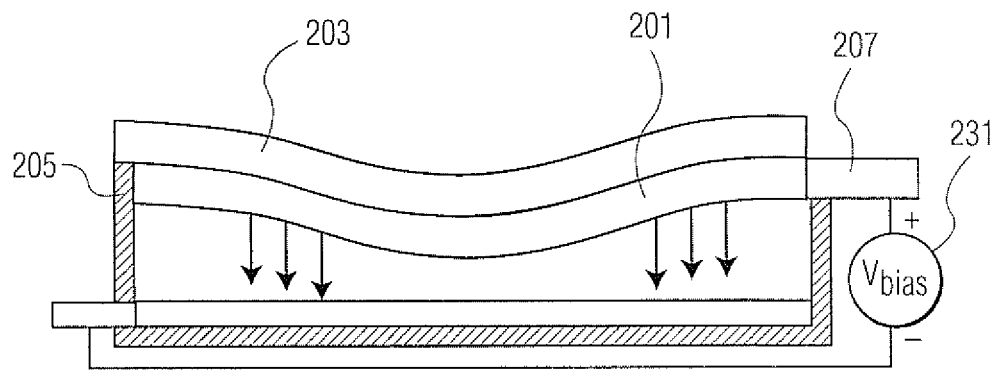
Figure 2I:
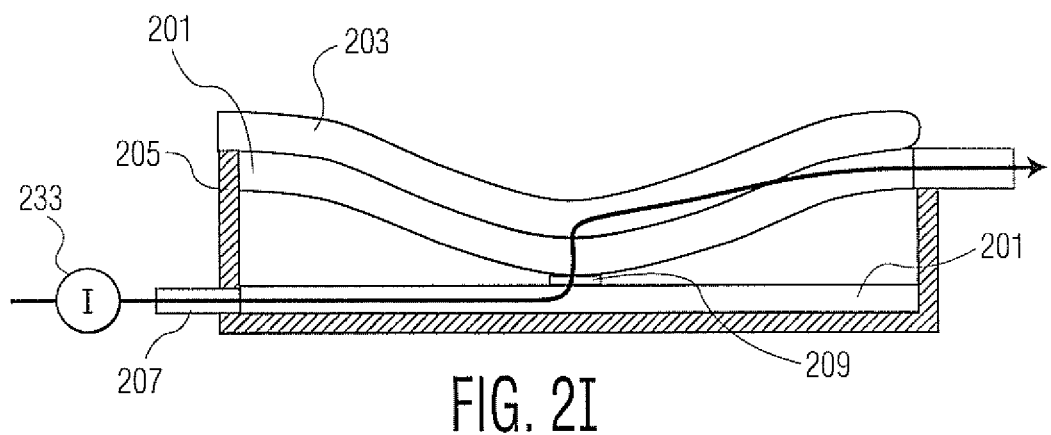

FIGS. 2G-2I illustrate another exemplary pressure sensor and pressure-actuated switch using an actuation electrode layer with an electrical contact. Pressure sensor 200 in FIGS. 2G-2I is similar to pressure sensor 200 in FIGS. 2A-2F, as it includes a signal path traversing from the substrate 205 to the membrane 203. Pressure sensor 200 in FIGS. 2G-2I also includes actuation electrode layers 201 on both the substrate and the bottom side of the membrane 203. In the illustrative embodiment, the electrical contact 209 may be included in both of the actuation electrode layers 201. In such instances, the actuation electrodes may not be isolated from the signal path; rather, the actuation electrode layers 201 may include both the signal path 207 and electrical contacts 209. As shown in FIG. 2I, when the actuation electrode layers 201 make contact at a defined pressure, each of the electrical contacts 209 make contact with each other, with the signal path traversing from the substrate 205 to the membrane 203.

Figure 3A:
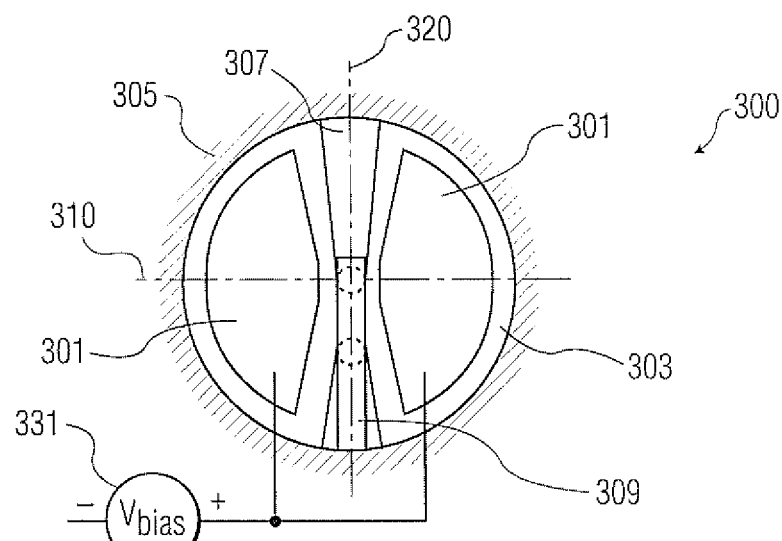
FIGS. 3A-3C illustrate another exemplary pressure sensor and pressure-actuated switch using multiple electrical contacts, with cross-sections of the exemplary pressure sensor and switch.
Figure 3B:
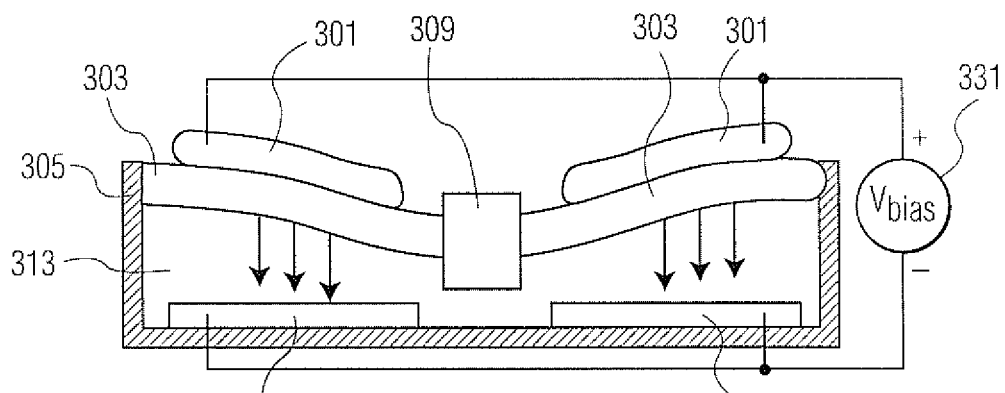
Figure 3C:
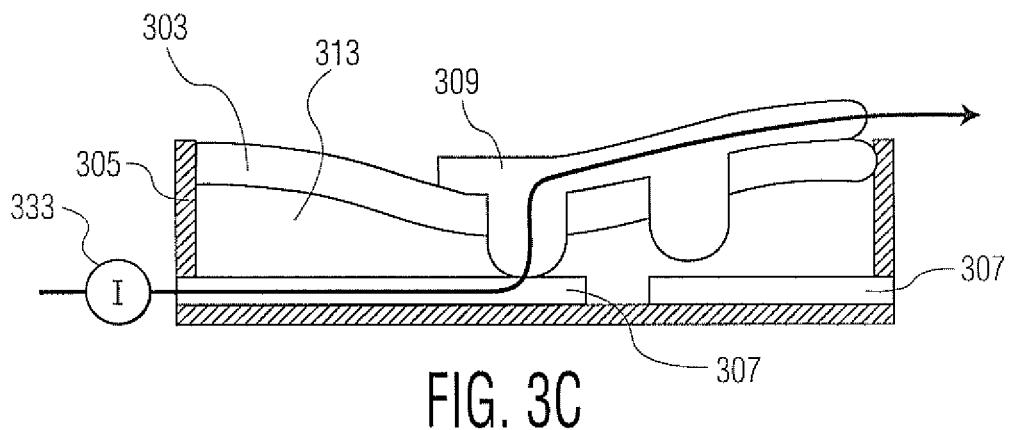
Figure 3D:
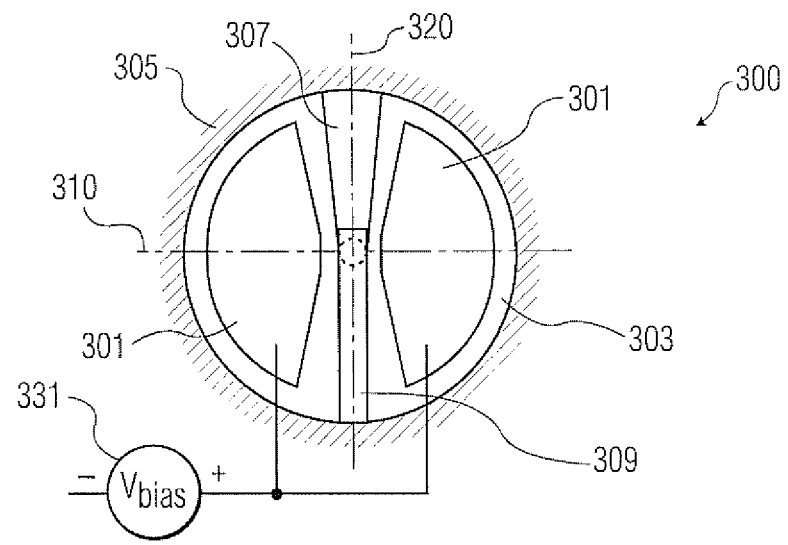
FIGS. 3D-3G illustrate another exemplary pressure sensor and pressure-actuated switch using a lever, with cross-sections of the exemplary pressure sensor and switch.
Figure 3E:
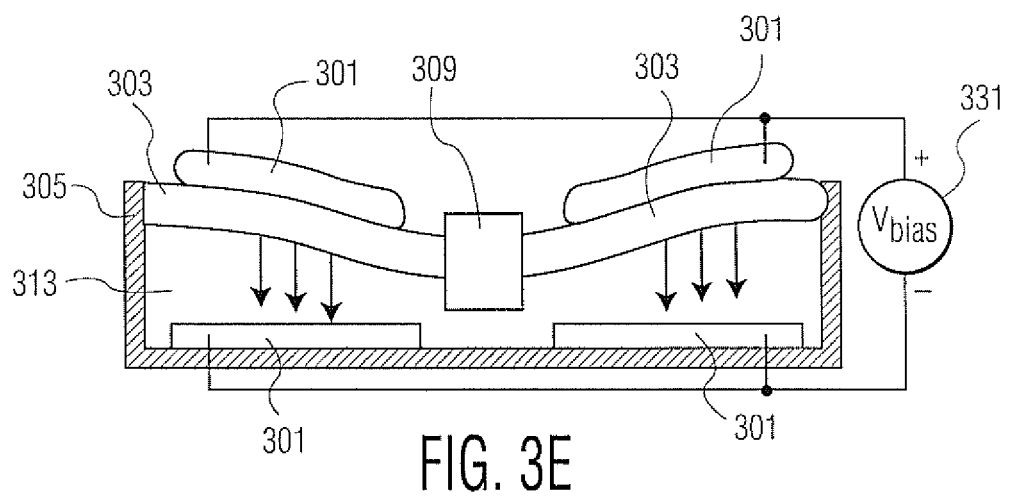
Figure 3F:
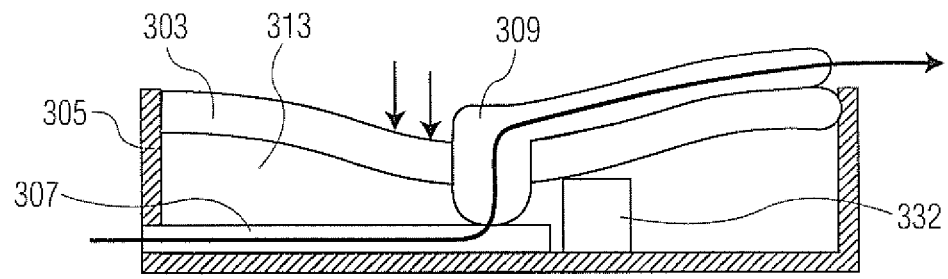

FIGS. 3A-3C illustrate another exemplary pressure sensor that includes multiple electrical contacts. Pressure sensor 300 may be similar to the pressure sensor 100, 200, with similar components 301-333. However, as illustrated in FIGS. 3A-3C, the electrical contact 309 may include more than one interconnect, which each interconnect located at different distances away from the edge of the membrane 303. In such instances, a first interconnect may make contact with the signal path 307 located on the substrate 305 at a first defined touch-point pressure, while a second interconnect may make contact with the signal path 307 at a second defined touch-point pressure.

In the illustrative embodiment, for example, the first interconnect makes contact with the signal path 307 at the first defined touch-point pressure, while a gap still remains in the cavity 313 between the second interconnect and another portion of the signal path 307. In this embodiment, one portion of an electrical circuit may be closed while another remains open. This may result in an electrical signal passing through the first portion of the signal path 307 and the electrical contact 309 without passing through the second portion of the signal path 307. The signal may therefore traverse through the signal path 307 connected to the membrane 303. At a second defined touch-point pressure, the second interconnect may make contact with the second portion of the signal path 307, which may result in the electrical signal passing through the second interconnect and the second portion of the signal path 307.

In some embodiments, the external electrical circuit connected to the signal path 307 may behave differently based on the number of contacts made. For example, the electrical signal may flow from the signal path 307 to the electrical contact 309 the portion of the signal path connected the membrane 303 as illustrated when only the first interconnect makes contact at the first touch-point pressure. However, when at the second touch-point pressure, the electrical signal may flow through the second interconnect to the second portion of the signal path 307, similar to the current flow of the pressure sensor 100 of FIG. 1A-1L.

In some embodiments, when the first interconnect makes contact with a portion of the signal path 307, a linear capacitance-pressure relationship may result within the pressure sensor 300. Because the capacitance scales with area, the electrical contacts may be placed at a squared distance from the center of the membrane 303 to produce linear responses to changes in pressure. In some embodiments, a system may similarly use multiple pressure sensors 100 with different sized radii. Because the touch-point pressure scales proportionally with $1/R^4$, only small variations in distance in the membrane 303 are necessary to enable reactions to a large ambient pressure range.

Figure 3G:
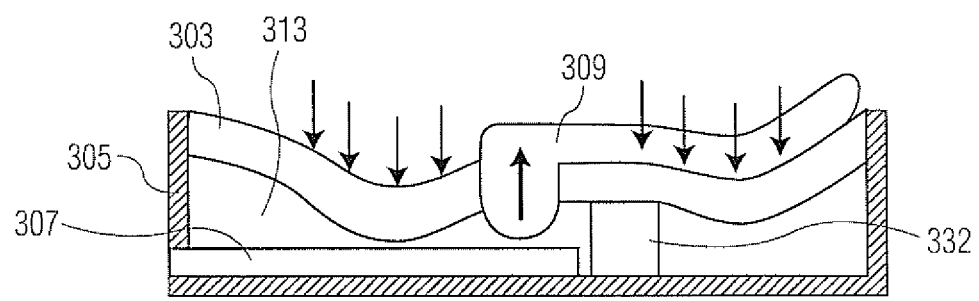

FIGS. 3D-3G illustrate another exemplary pressure sensor with a lever. Pressure sensor 300 of FIGS. 3D-3G includes components 301-331, 333 similar to components 101-133 of the pressure sensor 100. Pressure sensor 300 may also include a lever 332 which may be positioned in a similar manner to that used to position the electrical contacts 109, 209. In some embodiment, the lever 332 may be positioned on the substrate. In alternative embodiments, the lever 332 may be positioned on the membrane 303 while remaining inside the cavity 313. As an example, in the illustrative embodiment, the electrical contact 309 is positioned with an interconnect in the membrane 303 and initially has galvanic contact with the signal path 307 so that an electrical circuit is closed and an electrical signal flows through the signal path 307 and the electrical contact 309. As shown in FIG. 3G, when reaching a defined touch-point pressure, the membrane 303 may deflect to the lever 332, pivoting the membrane 303 on the lever 332 to break contact between the signal path 307 and the electrical contact 309. In some embodiments, the lever 332 may be used in conjunction with multiple electrical contacts 309, where the pressure sensor 300 is used for inverse switching.

Figure 4:
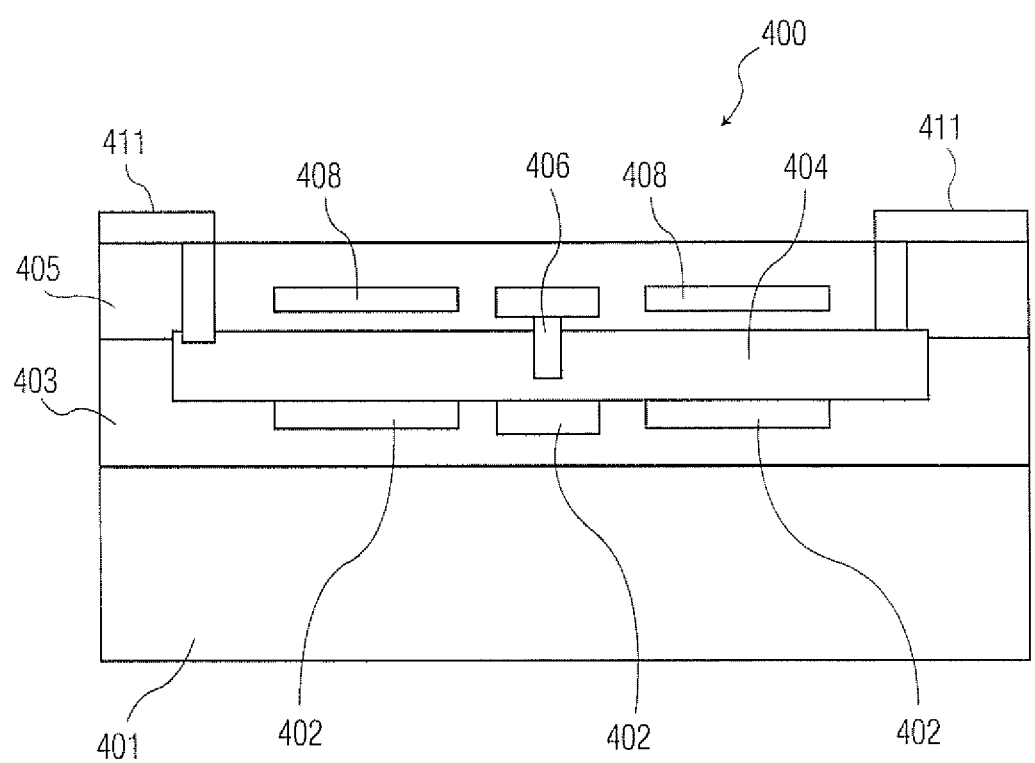
FIG. 4 illustrates a cross-section of an exemplary pressure sensor.

FIG. 4 illustrates a cross-section of an exemplary pressure sensor. FIG. 4 illustrates an exemplary pressure sensor 400 that includes a back-end-of-line (BEOL) layer 401, a substrate 403 including bottom actuation electrodes and signal path 402, a cavity 404, a membrane 405 including an electrical contact 406 with an interconnect, top actuation electrodes 408, and PVD plugs 411. As illustrated, the membrane 405 may comprise a single layer that uses the PVD plugs 411 to seal the holes used to form the cavity 404. PVD plugs 411 may be positioned in the membrane 405 so that they are not located in portions of the membrane 405 that deflect in response to ambient pressure.

In some embodiments, the actuation electrodes 402, 408 may be made of the same material as the electrical contact 406 and the PVD plug material. In alternative embodiments, the electrical contact 406 may be made from non-corrosive, non-oxidative materials (e.g., gold), alloys of such materials, or alloys of noble materials with refractory materials (e.g., titanium-tungsten, tantalum, tantalum nitride, etc.). In some embodiments, the dimensions of the membrane 405 may be configured so that they do not deflect under normal ambient pressures.

In some embodiments, a memory may be included with the pressure sensor 400. This memory may be separate hardware or may be a function of the pressure sensor 400 that activates at a defined pressure level. In such instances, the pressure sensor 400 may be configured to permanently close in response to a large current flow through the signal path 107. Similarly, the pressure sensor may be configured to have the actuation electrodes 101 keep the switch closed until the high voltage is discharged from the switch 400.

In some embodiments, the pressure sensor 400 may be attached to a power source, such as a battery, that may enable the pressure sensor 400 to make active responses, such as triggering an alarm when the switch is closed. Similarly, some embodiments enable a user to manually close the switch to test an alarm or to enable a pressure read-out even when the ambient pressure is not at a touch-point pressure threshold. In such instances, the signal path 107 may be closed through an additional electrical contact 109 that may allow current flow when the ambient pressure is not yet at a touch-point threshold.

Figure 5:
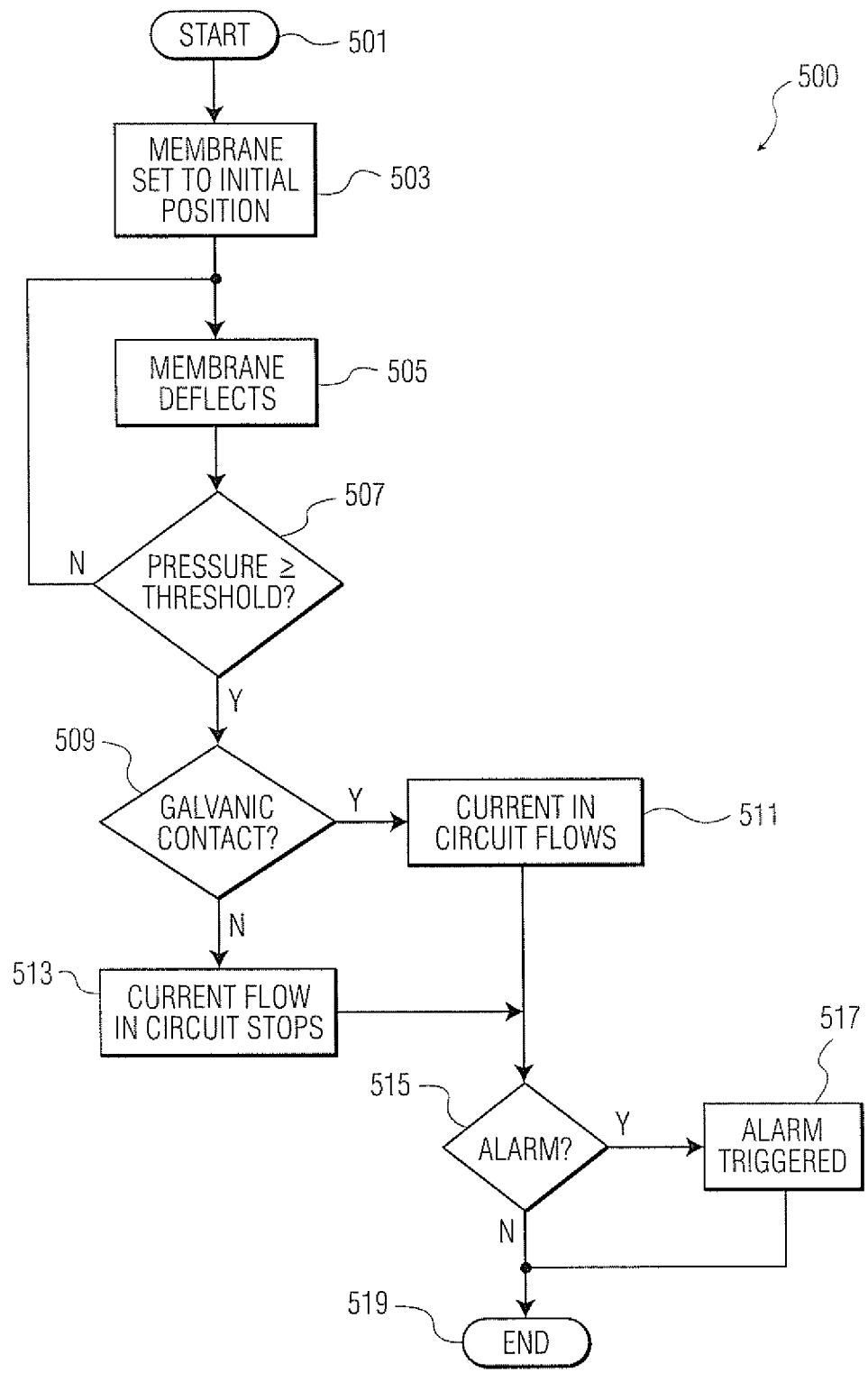
FIG. 5 illustrates an exemplary flowchart for the pressure sensor to trigger an alarm.

FIG. 5 illustrates an exemplary flowchart for the pressure sensor to trigger an alarm. Pressure sensor 100 may implement method 500, for example, when the pressure sensor is an electrical switch or attached to an electrical switch so that a touch-point pressure may trigger an electrical current to flow through an external electrical circuit.

Method 500 may begin at step 501 and may continue to step 503, where the membrane 103 of the pressure sensor is set to its initial position. In some embodiments, the initial position is set so the electrical contact 109 does not have contact with the signal path 107. In alternative embodiments, the initial position is set so that the electrical contact 109 has contact with the signal path; in such instances, the pressure sensor 100 also includes a lever 331.

In step 505, the membrane 103 deflects in response to an ambient pressure. Membrane 103 may deflect in the cavity 113 when the measured ambient pressure is within the operating range of the pressure sensor 100. In step 507, the pressure sensor 507 may determine whether the measured ambient pressure is equal to or exceeds the touch-point pressure threshold. When the measured ambient pressure is below this threshold, the pressure sensor 100 may remain in the same state as its initial position and the method may return to step 505, where it waits for the membrane 103 to further deflect. When the measured ambient pressure is equal to or exceeds a touch-point pressure threshold, the state of pressure sensor 100 changes, proceeding to step 509.

In step 509, it is determined whether there is contact between the electrical contact 109 and the signal path 107. In some embodiments, the change in state may initiate contact between the electrical contact 109 and the signal path 107. In such instances, the sensor 100 may proceed to step 511, where current flow begins in the electrical circuit. Alternatively, the change in state may break contact between the electrical contact 109 and the signal path 107. In such instances, the sensor 100 may proceed to step 513, where the current flow in the circuit stops.

After steps 511 or 513, the sensor 100 may proceed to step 515, where it is determined whether an alarm is triggered. For example, the sensor 100 may be configured to trigger an alarm when the state of the sensor 100 is changed from no current flow to a current flow. In such instances, the sensor 100 may proceed from step 515 to step 517, where the alarm is actually triggered. This may comprise, for example, the electrical circuit initiating a pressure readout. In some instances, the electrical circuit may also initiate more active steps, such as opening a vent or similar actions to actively change the ambient pressure of a system. After step 517 or in instances when an alarm is not triggered, method 500 may end at step 519.

FIGS. 6A-6L illustrate an exemplary method for fabricating a pressure sensor. A manufacturer may implement the layering process illustrated in FIGS. 6A-6L to produce a sensor similar to the pressure sensor 100, 400 of FIGS. 1A-1C and 4, respectively.

Figure 6A:
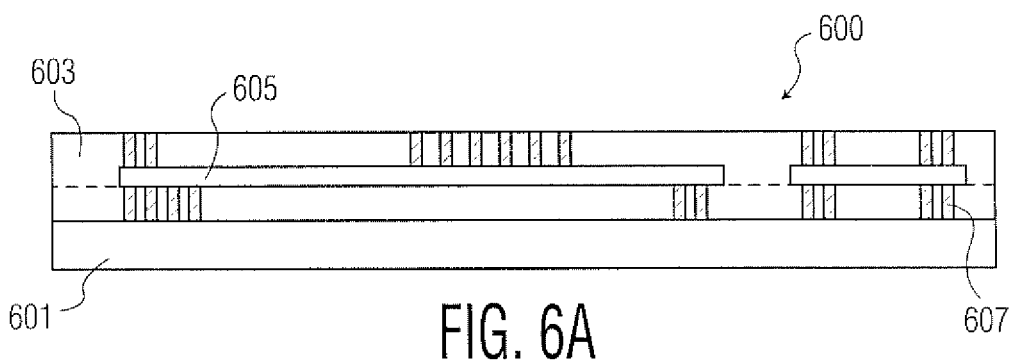
FIGS. 6A-6L illustrate an exemplary method for fabricating a pressure sensor.

FIG. 6A illustrates an exemplary CMOS substrate 600 comprising back-end-of-line (BEOL) layer 601, and a substrate layer 603 that includes, for example, a Physical Vapor Deposited (PVD) aluminum layer 605 and Chemical Vapor Deposited (CVD) tungsten plugs 607. In some embodiments, the substrate layer 603 may be included in the BEOL layer 601. BEOL layer 601 and the substrate layer 603 may also include copper interconnect lines and vias embedded in a tantalum/tantalum nitride diffusion barrier layer. BEOL layer 601 may include, for example, up to 5 layers of metal. CMOS substrate 600 may then include an oxide (for example, silicon oxide) on top of the BEOL layer. To include the aluminum layer 605, holes may be used to contact the layer, while a CVD plugs 607 comprising of a metal such as tungsten may be used to fill the holes after the aluminum layer is set.

Figure 6B:
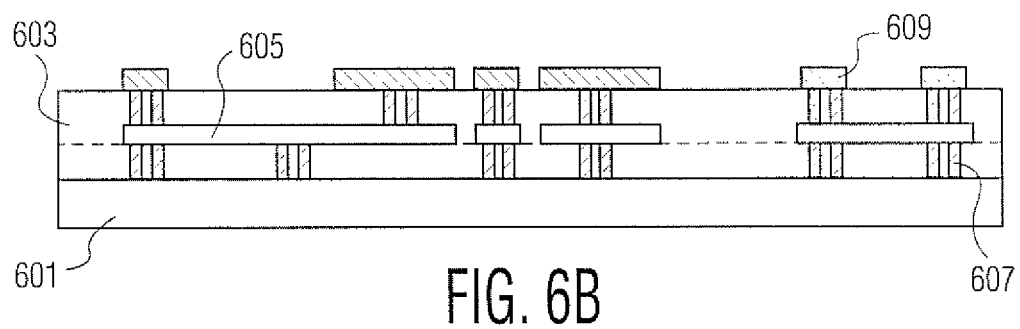

FIG. 6B illustrates the deposition of the bottom electrode and contact metal layer 609. In some embodiments, the bottom electrode and contact metal layer 609 may include the actuation electrodes 101, signal path 107, and/or electrical contact 109 including an interconnect with one or more dimples. When the layer 609 includes the electrical contact 109 including an interconnect with one or more dimples, the electrical contact 109 may be made of a noble metal (e.g., Pt, Pd, Au, Ag, Rh, Ir, Ru, Os) in order to avoid oxidation and to minimize contact resistance. Similarly, the electrical contact 109 may also be made of an alloy of noble metals or an alloy of a noble metal with a transition metal in the series of: Ni, Cr, Mo, W, Cu, Al, Ti, Zr, Hf, V, Nb, Ta, or Co.

In some embodiments, a combination of metals may be used to apply the layer 609. For example, when apply the layer 609 using physical vapor deposition (PVD), titanium may be used as an adhesion layer, while platinum may be placed on the adhesion layer. In some embodiments, a mask may be used to set the patterning of the layer 609. Continuing with the Ti/Pt example, the Pt layer may be set using ion-beam etching that uses a metallic hard mask, such as Al or Mo.

Figure 6C:
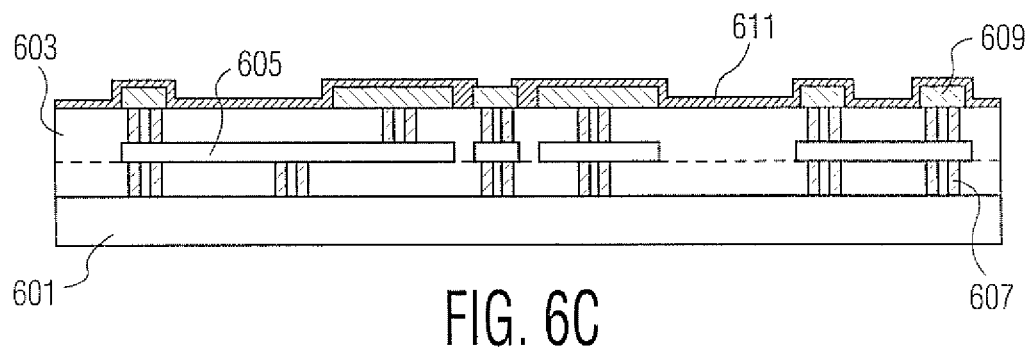

FIG. 6C illustrates the deposition of a protection layer 611 over the bottom electrode and contact metal layer 609. In some embodiments, the protection layer 611 may not be added; this may occur when the sacrificial layer 613 and the bottom electrode and contact metal layer 609 do not interact and may be removed selectively to each other. Protection layer 611 may comprise of a plasma-enhanced chemical vapor deposition (PECVD) silicon nitride, silicon carbide, or silicon oxide (in some embodiments, tetraethyl orthosilicate [TEOS]) layer. Protection layer 611 may be very thin to improve the overall sensitivity of the switch 100. In some embodiments, the protection layer 611 may be annealed to densify the layer 611. As illustrated, asecond mask may be used in some embodiments to pattern the protection layer 611 in order to allow an opening for the contact dimple when included in the bottom electrode and contact layer 609.

Figure 6D:
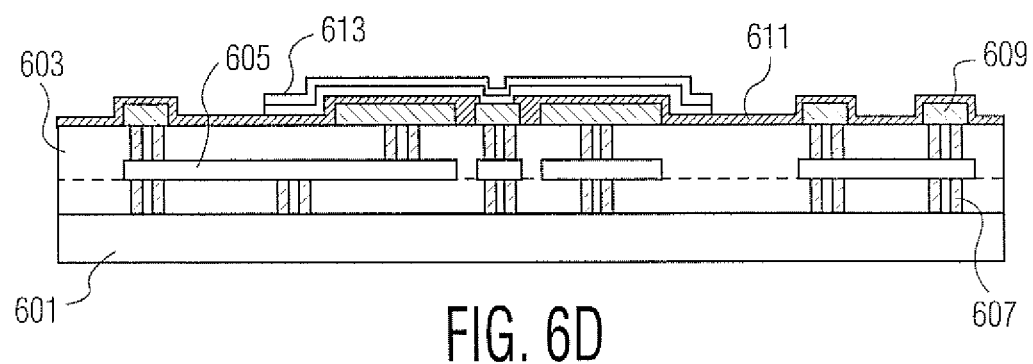

FIG. 6D illustrates the deposition of the sacrificial layer 613 over the protection layer 611 and/or bottom electrode and dimple metal layer 609. The size of the sacrificial layer 613 may directly determine the gap height of the cavity 113 of the switch 100 once manufactured. Sacrificial layer 613 may also determine the sensitivity and operating pressure range of the switch 100. Sacrificial layer 613 may be made of a material such as aluminum, molybdenum, titanium, tungsten, or a similar metal. In some embodiments, the sacrificial layer 613 may also be made of a dielectric material, such as silicon oxide, as long as the contact metal layer 609, protection layer 611, the membrane layer 614, and the membrane capping layer 619 are not removed during the sacrificial etch. As shown in FIG. 6D, some embodiments also include an intermediate stopping layer. This may be used in some instances in lieu of the bottom membrane layer 614. The intermediate stopping layer may be made of aluminum oxide or similar material, or of a dielectric material. In some embodiments, a mask may be used to position the sacrificial layer 613 and the intermediate stopping layer. The location of the intermediate stopping layer may in some embodiments, determine the dimple height and therefore the touch-point pressure of the electrical contact 109.

Figure 6E:
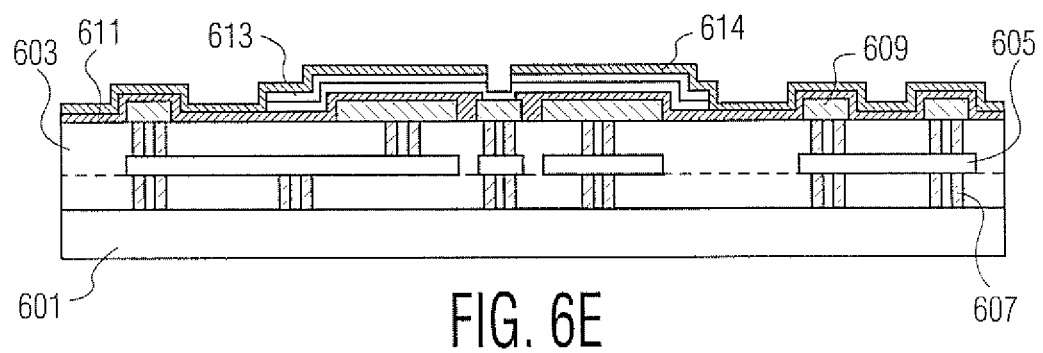

FIG. 6E illustrates the deposition of the bottom membrane layer 614 over the sacrificial layer 613. As stated above in relation to the membrane 103, the membrane layer 614 may be made of a thin PECVD silicon nitride layer or a layer of similar material such as PECVD silicon carbide that may deflect in response to a defined ambient pressure range. Bottom membrane layer 614 may be annealed in order to densify the layer. As illustrated in FIG. 6E, a mask may be used to pattern the bottom membrane layer 614 so that, when etched (through, for example, dry etching), the dimple is open for contact when the sacrificial layer 613 and intermediate stopping layer are removed.

Figure 6F:
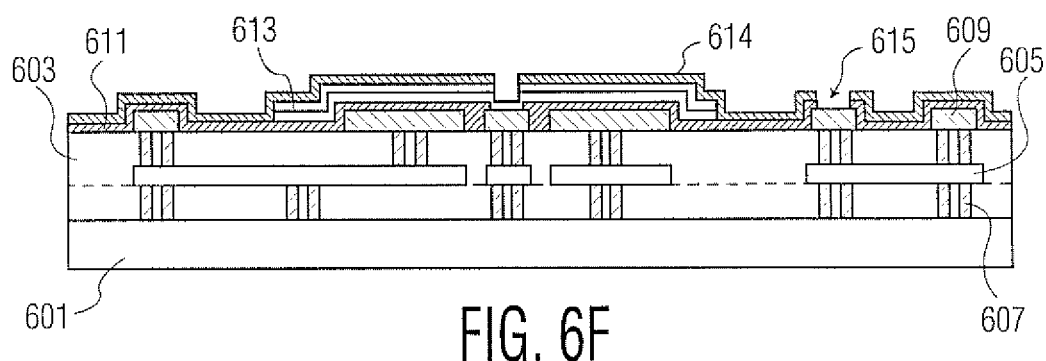
Figure 6G:
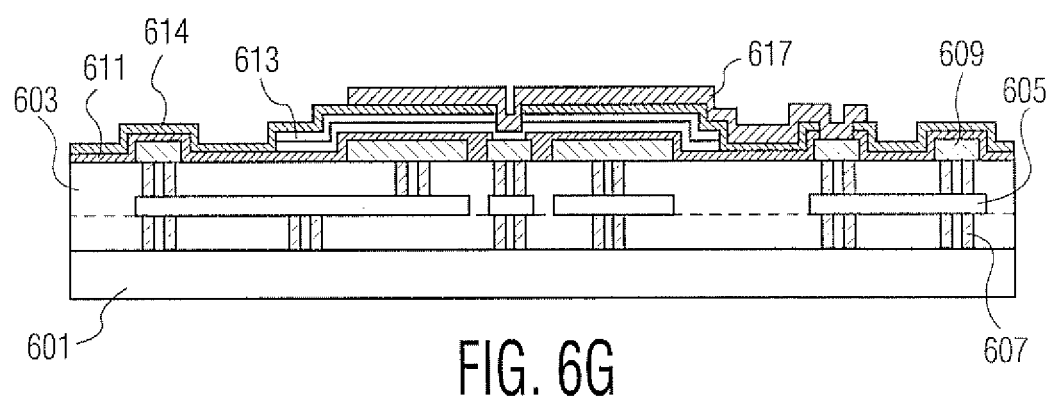

FIG. 6F illustrates the etching of the bottom membrane layer 614. As illustrated, a dry etch may make a contact 615 for the top electrode. FIG. 6G illustrates the deposition of the top electrode layer 617 over the bottom membrane layer 614. Top electrode layer 617 may be made of the same material as the bottom electrode and dimple metal layer 609. Top electrode layer 609 may be thin to enable high overall sensitivity for the switch 100. In some embodiments, an Ar plasma may be used to clean the surface of the contact 615 prior to the deposition of the top electrode layer 617 to enable a good contact between the bottom electrode layer 609 and the top electrode layer 617. In some embodiments, a hard metallic (e.g., Al or Mo) mask may be used during ion-beam etching to pattern the top electrode layer 617.

Figure 6H:
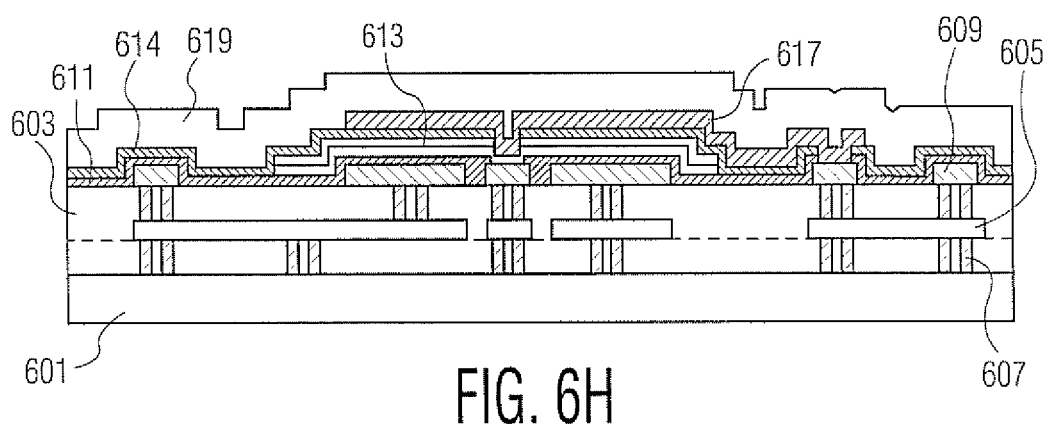

FIG. 6H illustrates the deposition of the capping layer 619. Capping layer 619 may be a thick layer of PECVD silicon nitride; the diameter, thickness, and internal stress of the capping layer 619 may determine the rigidity of the membrane 103. The stress of the capping layer 619 may be configured through the choice of deposition methods. For example, in the case of PECVD silicon nitride, the silane ($SiH_4$) or ammonia ($NH_3$) flow rates, plasma power, or deposition temperature (e.g., 400° C) may change the stress of the membrane 103. In some embodiments, the capping layer 619 may be annealed; for example, the capping layer 619 may be furnace-annealed at 405° C., which may then take a number of hours to stabilize and densify, while also removing excessive hydrogen from the membrane 103. In some embodiments, the capping layer 619 may be PECVD silicon dioxide or PECVD silicon carbide.

Figure 6I:
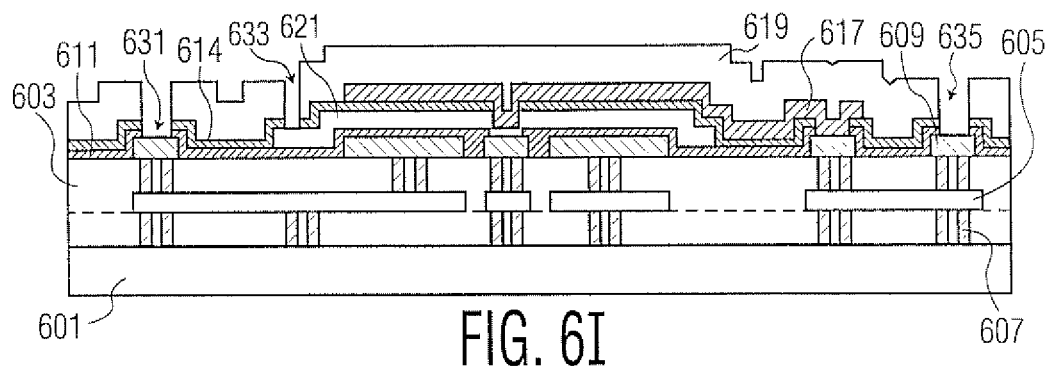

FIG. 6I illustrates the patterning of sacrificial holes in the membrane layers 614, 619. A dry etch on the membrane layers 614, 619 may create contact holes 631, 635 and a sacrificial etch hole 633, stopping at the bottom electrode layer 609 and the sacrificial layer 621, respectively. Once the etching of holes 631-635 occurs, the sacrificial layer 621 may be removed using a PS etch (e.g., $H_3PO_4+HNO_3$), the sacrificial layer being Al, Mo, or an ammonia-hydrogen-peroxide etch (e.g., $NH_4OH+H_2O_2$), the sacrificial layer being Ti or W. In some embodiments, an isopropyl alcohol (IPA) drying step may occur after the removal step. This may be done when the membrane 103 has a large diameter. Alternatively, an extra mask of anti-sticking bumps may be applied after the deposition of the sacrificial layer 621. In some embodiments, the sacrificial layer 621 may be a silicon dioxide and may be removed using a dry etch (for example, an HF vapor). In some embodiments, an annealing step (e.g. furnace annealing) may be done to remove water from the cavity 113 form by the removal of the sacrificial layer 621 and to remove excess hydrogen from the membrane layers 614, 619.

Figure 6J:
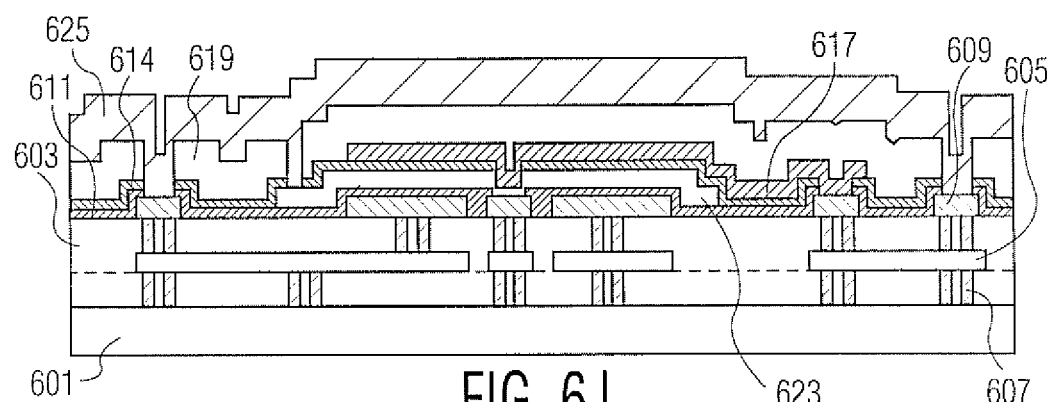

FIG. 6J illustrates the deposition of PVD layer 625 over the capping layer 619. As stated above in relation to PVD plugs 411, the PVD layer 619 may be made from aluminum, titanium, titanium nitride or similar material and may be used to plug the cavity 623 and to form the bond pads of the pressure sensor 100. In some embodiments, a "hot" PVD aluminum (e.g., deposition at 350° C.) flow is used to create a "reflow" into the etch holes 631-635. This may seal the etch holes 631-635 without using a seam. The closure of the sacrificial etch hole 633 may create a vacuum-sealed cavity 623 at the PVD base pressure. In some embodiments, the pressure in the cavity 623 may be a non-zero pressure, having a pressure below the ambient pressure measured by the membrane 103 such that it may deflect into the cavity 113. For example, if the pressure sensor 100 is designed to operate for a range of 300-500 mbar, the pressure in the cavity 623 may be below 200 mbar.

Figure 6K:
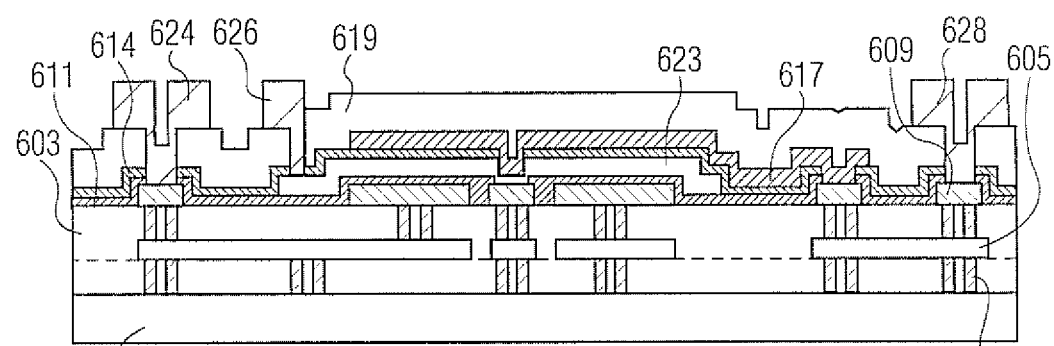

FIG. 6K illustrates the patterning of the PVD layer 625. A mask may be used to pattern the PVD layer 625 to create the PVD plug 626 and bond pads 624, 628. In some embodiments, the PVD layer 625 may be removed from the capping layer 619 using a mask and wet or dry etching. In some embodiments, the membrane 103 may deflect slightly in response to the ambient pressure after the removal of the PVD layer 625. This may be due to a vacuum or low pressure inside the cavity 623.

Figure 6L:
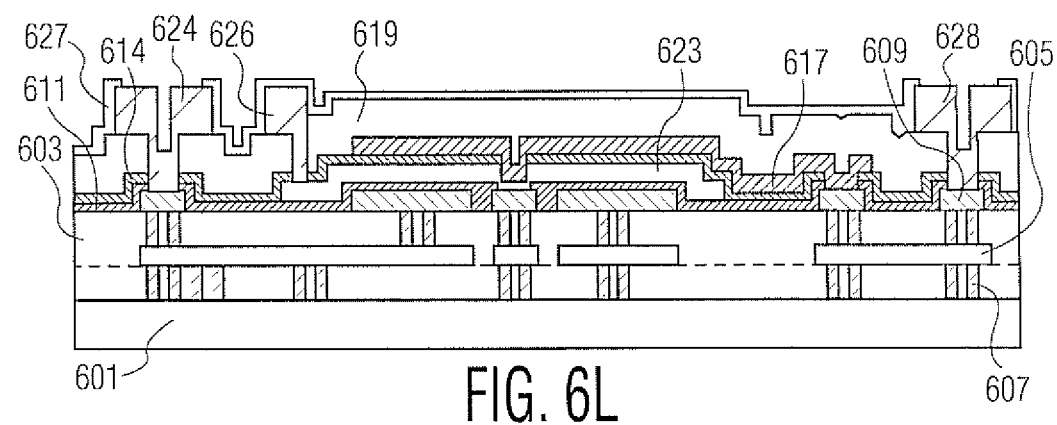

FIG. 6L illustrates the deposition of passivation layer 627 on the capping layer 625, PVD plug 626, and bond pads 624, 628. Passivation layer 627 may be made of the same material as the membrane layers 611, 614, 619. A mask may be used to pattern the passivation layer so that the bond pads 624, 628 remain exposed. In some embodiments, an annealing step at, for example, 450° C. may take place after the deposition of the passivation layer 627 to densify the layer.

It should be apparent from the foregoing description that various exemplary embodiments of the invention may be implemented in hardware and/or firmware. Furthermore, various exemplary embodiments may be implemented as instructions stored on a tangible machine-readable storage medium, which may be read and executed by at least one processor to perform the operations described in detail herein. A tangible machine-readable storage medium may include any mechanism for storing information in a form readable by a machine, such as a personal or laptop computer, a server, or other computing device. Thus, a tangible machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principals of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

We claim:

1. A pressure sensor configured to measure an ambient pressure, the pressure sensor comprising:
a substrate including a first metallic contact;
a membrane attached to the substrate, the membrane including a second metallic contact and responding to the ambient pressure by deflection, wherein the ambient pressure is measured based upon touch-point deflection of the membrane;
a cavity wherein the first and second metallic contacts are located;
a contact area between the first and second metallic contacts that enables contact between the first and second metallic contacts when the membrane deflects at a defined pressure; and
a signal path that allows a current flow when the first metallic contact makes contact with the second metallic contact.

2. The pressure sensor of claim 1, wherein one of the first or second metallic contacts further comprises:
an interconnect including the contact area that makes contact with the other metallic contact when the membrane is deflected through a height of the cavity.

3. The pressure sensor of claim 2, wherein:
the interconnect further comprises a second contact area, and
the signal path comprises two separate portions on one of the substrate or the membrane, wherein the interconnect makes contact with the two separate portions of the signal path when the membrane is deflected through the height of the cavity.

4. The pressure sensor of claim 1, wherein the first metallic contact initially does not make contact with the second metallic contact, and the first metallic contact makes contact with the second metallic contact when the ambient pressure exceeds the defined pressure.

5. The pressure sensor of claim 4, further comprising:
a series of metallic contact pairs, each metallic contact pair comprising:
a membrane metallic contact, and
a substrate metallic contact, wherein each metallic contact pair makes contact when the membrane deflects at distinct pressures.

6. The pressure sensor of claim 1, wherein the first metallic contact initially makes contact with the second metallic contact, and the first metallic contact breaks contact with the second metallic contact when the ambient pressure exceeds the defined pressure.

7. The pressure sensor of claim 6, further comprising:
a lever that causes the first metallic contact to break contact with the second metallic contact when the membrane deflects through a height of the cavity.

8. The pressure sensor of claim 1, further comprising:
a first actuation electrode layer on the substrate; and
a second actuation electrode layer on the membrane.

9. The pressure sensor of claim 8, further comprising:
a pressure-actuated switch that deflects the membrane in response to an applied electric potential difference between the first and second actuation electrode layers.

10. The pressure sensor of claim 8, further comprising:
a pressure indicator that measures an applied pressure based on a capacitive measurement between the first and second actuation electrode layers.

11. The pressure sensor of claim 8, further comprising:
a user-controlled system that applies an electric potential difference between the first and second actuation electrode layers until the first and second metallic contacts make contact.

12. The pressure sensor of claim 8, further comprising:
a transistor whose state is based on contact between the first and second metallic contacts.

13. The pressure sensor of claim 12, wherein the transistor is connected to an electrical circuit, and an active current flow in the electrical circuit is based on the state of the transistor.

14. The pressure sensor of claim 13, wherein the active current flow in the electrical circuit triggers an alarm.

15. The pressure sensor of claim 8, further comprising:
a configuration system that:
applies an electric potential difference between the first and second actuation electrode layers to deflect the membrane;
detects a change in capacitance after the deflection of the membrane;
compares the detected change in capacitance to stored calibration data; and
applies a correction voltage between the first and second actuation electrode layers to deflect the membrane to a corrective position.

16. The pressure sensor of claim 1, wherein the cavity is sealed during manufacture and a cavity pressure inside the sealed cavity is a vacuum or is less than the defined pressure.

17. The pressure sensor of claim 16, further comprising:
a metallic plug that seals the cavity, comprising at least one of Al, Ti, TiW, W, Ta, TaN, or Cu.

18. The pressure sensor of claim 1, wherein the metallic contacts comprise one of:
a noble metal from the group of Au, Ag, Pt, Pd, Ru, Os, Ir, or Rh;
an alloy of the noble metals; or
an alloy of the noble metal with a refractory metal from a group of Al, Ti, Zr, Hf, Ta, Nb, V, W, Mo, Cr, Co, Mn, Cu, or Ni.

19. A method comprising:
providing, by a substrate, a first metallic contact;
measuring, by a pressure sensor having a membrane including a second metallic contact, an ambient pressure, wherein the ambient pressure is measured based upon touch-point deflection of the membrane;
deflecting, by the membrane in response to the measured pressure, through a height of a cavity to the substrate;
making, by the second metallic contact, contact with the first metallic contact when the membrane deflects at the measured pressure; and
conducting, by a signal path, a current flow when the first metallic contact makes contact with the second contact.

* * * * *